Nov. 15, 1927.  1,649,038
C. McL. MOSS
AUTOMATIC STATION
Filed March 14, 1921
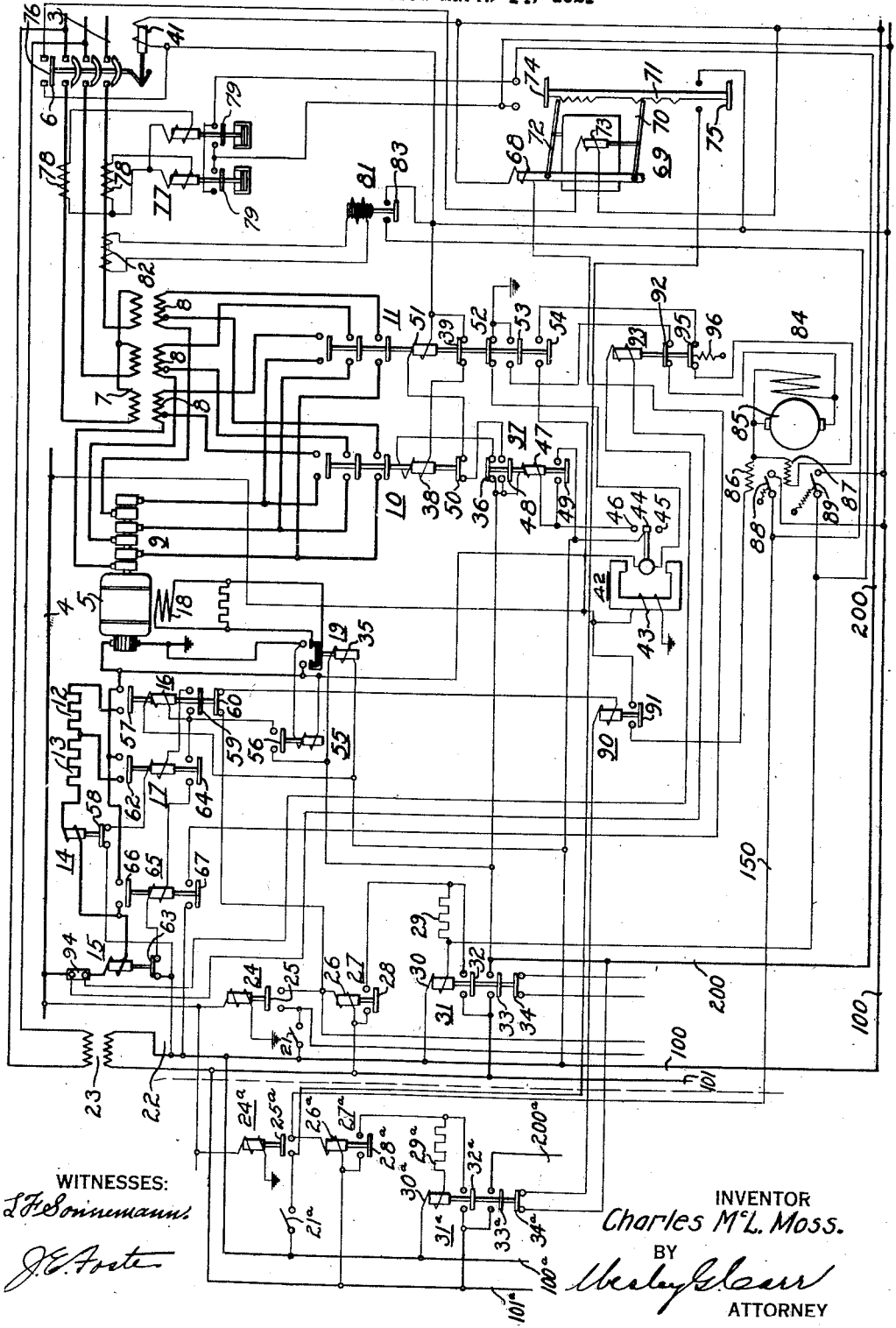
WITNESSES:
INVENTOR
Charles McL. Moss.
BY
ATTORNEY Patented Nov. 15, 1927.

1,649,038

UNITED STATES PATENT OFFICE.

CHARLES McL. MOSS, OF PITTSBURGH, PENNSYLVANIA, ASSIGNOR TO WESTINGHOUSE ELECTRIC & MANUFACTURING COMPANY, A CORPORATION OF PENNSYLVANIA.

AUTOMATIC STATION.

Application filed March 14, 1921. Serial No. 452,108.

My invention relates to automatic stations and particularly to transfer systems for the control of a plurality of converters in such stations.

One object of my invention is to provide means, in a system embodying a plurality of machines, for automatically connecting an additional machine to the load circuit of the system when the load on the system attains or exceeds a predetermined percentage of the rating of one machine.

Another object of my invention is to provide means, in a system of the above indicated character, that shall control the connection of an additional machine to a load circuit in accordance with the temperature of an operating machine.

A further object of my invention is to provide means, in a system of the above indicated character, that shall control the connection of a plurality of machines to the system in a predetermined sequence.

A still further object of my invention is to provide a system of the above indicated character in which the control shall be automatically transferred from one machine to start a second machine if the first machine is not connected to the system within a predetermined interval of time.

A still further object of my invention is to provide a sytsem in which the first machine shall be locked out if it is not connected to the system under predetermined conditions and the control automatically transferred to start a succeeding machine in a predetermined sequence.

Another object of my invention is to provide a system of the above-indicated character that shall be simple and economical in construction, and automatic and reliable in its operation.

Automatic substations have been employed to considerable extent in districts remote from a central generating station to supply direct-current energy to adjacent sections of a trolley system. In such substations, only one machine has been operated, since one machine had sufficient capacity to take care of any demand that might be made on the sections supplied by that machine. By reason of the increased cost of apparatus and of the manual operation thereof, it has been deemed desirable to also render direct-current generating stations in a congested district automatic.

The application of automatic apparatus to the control of more than one machine brings forth certain problems that may be encountered in such automatic operation. For example, when the load on an operating machine or on a plurality of operating machines attains a predetermined value, an additional machine should be connected to the system to help supply the energy demand.

Also, if the starting and connecting apparatus of a machine fails to connect that machine to the circuit within a predetermined interval of time, another machine should be connected to the circuit to supply the demand thereon. Upon the repeated occurrence of such a condition, under which the first machine is not connected to the system, it is deemed desirable to lock out that machine entirely from the system until an attendant may rectify the trouble that prevents the operation of the machine.

United States Patent No. 1,435,229, issued Nov. 14, 1922, to F. C. Hanker and C. McL. Moss, and assigned to the Westinghouse Electric & Manufacturing Company, discloses a system for automatically controlling the operation of one machine in accordance with the demand for energy made on a load circuit.

In the present invention, I employ the system disclosed in the above application for each machine. In addition, I provide means connected between the machines for controlling them in accordance with the condition of the previously-connected machines, in a predetermined sequence, and in accordance with the condition of the load circuit, which is supplied with energy by those machines.

Upon the occurrence of a demand for energy on the system, a machine is automatically started and connected to the load circuit to supply energy thereto. By means of selector switches severally associated with each machine, any machine may be made to start first when a demand is made on the system for energy.

When the first machine becomes overloaded or when its temperature attains a predetermined value, means are energized that automatically initiate the starting and connecting apparatus of a second machine in the predetermined sequence.

If, when the first demand for energy is made on the system, the first machine does not start within a predetermined interval of time, that is ordinarily sufficient to permit the connection of the machine to the system, means are energized to initiate the starting and connecting of the second machine to the system, and, under predetermined conditions, to lock the first machine from the system until the fault therein, that prevented the connection, may be rectified.

The single figure of the accompanying drawings is a diagrammatic view of an electrical system embodying my invention.

Referring to the drawing, the system comprises, in general, an alternating-current circuit 3, a direct-current circuit 4 and a synchronous converter 5 that may be connected therebetween to transform the alternating-current energy from circuit 3 to direct-current energy for the load circuit 4. The alternating-current energy from the circuit 3 is supplied to the converter 5 through an interrupter 6 and a transformer 7. Connections are made from the secondary windings 8 of the transformer 7 to the brushes of the slip rings 9 of the converter through a starting interrupter 10 and a running interrupter 11. The interrupter 10 is connected between the brushes of the slip rings 9 and relatively low-voltage terminals of the transformer windings 8, and the interrupter 11 is connected between the normal-voltage terminals and the brushes of the slip rings 9 of the converter. The interrupters 10 and 11 are so electrically interlocked that one may be closed only when the other is open.

The direct-current end of the converter is connected to the circuit 4 through a plurality of grid resistors 12 and 13 and a plurality of series-relays 14 and 15 by means of a contactor switch 16. The resistors are adapted to be close-circuited by contactor switches 17 and 65. The shunt field winding 18 of the converter is adapted to be connected across the commutator thereof by means of a switch 19.

Each machine of the system is provided with a selector switch 21 that controls the position of that machine in a predetermined sequence in which the machines are to be operated. Assuming that machine No. 1 is to be the first machine that shall be connected to the circuit 4 when a demand is made thereon for energy, switch 21 that is associated with machine No. 1 will be closed, and switches 21a, 21b, etc., of the succeeding machines in the sequence will be open.

An auxiliary control circuit 22 is energized from the circuit 3 through a transformer 23 to provide energy for operating the switching equipment of the system.

Upon a demand for energy on the circuit 4, the voltage of the circuit drops to or below a predetermined value that permits a voltage relay 24 to operate to close a switch 25. The closing of the switch 25 completes a circuit through the operating coil 26 of a relay 27, thereby operating the relay 27 to close a switch 28.

Upon the closing of the switch 28, a circuit is completed through a resistor 29 and the operating coil 30 of a relay 31. The relay 31 is thereupon actuated to close two switches 32 and 33 and to open a switch 34. The switch 32, when closed, maintains the relay 31 in its energized condition.

The switch 33, when closed, connects the bus conductor 101 with an auxiliary bus conductor 200. The two bus conductors 100 and 200 will henceforth serve as the control circuit from which energy will be supplied to operate the various switches.

Upon the energization of the auxiliary bus conductor 200, a plurality of circuits are immediately completed. One circuit is completed through the operating coil 35 of the relay 19, thereby operating the relay 19 to connect the shunt field winding 18 across the armature of the converter 5.

Another circuit is simultaneously completed from the auxiliary bus conductor 200, through a normally closed switch 36 of a control relay 37, operating coil 38 of the starting interrupter 10 and interlock switch 39 of the running interrupter 11, to the control bus conductor 100. The starting interrupter 10 is thereupon closed and the converter windings are connected to the relatively low-voltage taps of the transformer winding 8.

A third circuit is also simultaneously completed through the closing coil 41 of the interrupter 6. The interrupter 6 is thereupon closed and a relatively small value of electromotive force is impressed on the windings of the converter 5. The converter 5 is gradually started and accelerated to its synchronous speed.

In order to control the polarity of the converter 5, a polarized relay 42 is provided, comprising a direct-current motor, the field winding 43 of which is continuously excited from the direct-current circuit 4 and the armature windings of which are energized from the converter commutator brushes that should always be positive in polarity. If the converter 5 develops the correct polarity, the switch 19 remains closed and the shunt field winding 18 remains connected across the terminals of the commutator.

If, however, the converter 5 should develop the wrong polarity, the polarized relay 42 controls a reversing switch (not shown) by the engagement of the contact members 44 and 45, that causes the converter 5 to "slip a pole" and to develop the correct polarity.

This process of "slipping a pole" is well understood, by those skilled in the art, and the equipment for reversing the shunt field winding 18 is not shown in the accompanying diagram, since it would unnecessarily complicate the same and since it is not an essential element of my invention. Such a complete system is illustrated in the patent mentioned above and reference may be had thereto for a detailed description of the operation.

Assuming correct polarity in the converter 5, the polarized relay 42 effects engagement between its contact members 44 and 46, thereupon completing a circuit that energizes the operating coil 47 of the relay 37. The consequent actuation of the relay 37 opens its switch 36 and closes its two switches 48 and 49.

The opening of the switch 36 effects the opening of the starting interrupter. The closing of the switch 49 completes a locking circuit for energizing the coil 47 of the relay 37, and thereby maintains that relay in its energized position so long as the auxiliary bus conductor 200 is energized.

The switches 48 and 50 and the coil 51 of the interrupter 11 are connected in series in order that the coil 51 shall not be energized until the starting interrupter 10 is opened.

Upon the energization of the coil 51, the interrupter 11 is closed, thereby impressing normal line voltage upon the windings of the converter 5. The interrupter 11, when closed, opens two switches 39 and 52, the latter of which disconnects the polarized relay 42. The interrupter also closes two switches 53 and 54. The converter 5 is now running at synchronous speed, with the correct polarity, and may be connected to the direct-current circuit 4.

When the direct-current voltage of the converter attains a predetermined value, a relay 55, that is responsive thereto, closes its switch 56. A circuit is thereupon completed for energizing the operating coil of the contactor switch 16. The actuation of the interrupter 16 closes the switch 57, thereby connecting the direct-current end of the converter to the direct-current circuit 4 through the resistors 12 and 13 and the series relays 14 and 15.

If the circuit 4 is normal, so that no excessive current is drawn from the converter, the series relay 14 is not sufficiently energized to open its switch 58. The actuation of the contactor switch 16, in the meantime, has closed its auxiliary switch 59 and opened its auxiliary switch 60. The closing of the switch 59 completes a circuit through the operating coil of the relay 17. That relay is thereupon actuated to close a switch 62 that close-circuits the resistor 12.

Assuming that conditions remain normal and that no excessive current is drawn from the converter, the switch 58 of the series relay 14 is permitted to remain closed. Similarly, the switch 63 of the relay 15 is permitted to remain closed. The relay 17 has, meanwhile, closed its switch 64 that is connected in series with the switch 56 of the relay 55, the operating coil of a relay 65 and the switch 63 of the series relay 15 across the control circuit conductors 100 and 200.

Upon the closing of the switch 64 of the contactor switch 17, the relay 65 is actuated to close its switch 66 that close-circuits the resistor 13 and the series relay 14. The relay 65, when actuated, also closes an auxiliary switch 67.

If an excessive demand for current is made on the circuit 4, the series relay 15, that is adjusted to operate at a predetermined value, will open the switch 63 which will, in turn, de-energize the holding coil of the relay 65. The switch 66 is thereupon opened and the resistor 13 and the series relay 14 are reinserted between the converter and the circuit 4.

If the current supplied by the converter to the circuit 4 still exceeds a predetermined value, the relay 14 opens the switch 58 and thereby de-energizes the operating coil of the contactor switch 17, whereupon the resistor 12 is also inserted in the circuit between the converter and the direct-current circuit 4. The values of the resistance of the resistors 12 and 13 are such as to prevent excessive currents from traversing that circuit.

Upon the operation of the relay 65, the closing of its switch 67 completes a circuit through the reset coil 68 of a lock-out relay 69. The energization of the reset coil 68 disengages a pawl member 70 from a ratchet member 71 and permits a detent 72 to release the ratchet member 71 to permit the latter to return to its initial position, if it has, in the meantime, been raised by the pawl member 70.

The lock-out relay 69 further comprises an operating coil 73 that actuates the pawl member 70 to raise the ratchet member 71. The ratchet member, when raised, is engaged by the detent member 72 that maintains it in its raised position, if the coil 68 is not energized to render the pawl member 70 and the detent member 72 ineffective. Two switches 74 and 75 are controlled by the ratchet member 71 and are closed when that member has been actuated a predetermined number of times, illustrated here, for convenience, as three times.

The function of the lock-out relay 69 is to lock out the unit comprising the converter 5 and the controlling apparatus, if a fault should obtain in the unit that would cause the interrupter 6 to be closed three times before the converter would be connected to the direct-current circuit 4.

Upon the closing of the main interrupter 6, an auxiliary switch 76 is closed thereby that completes a circuit for energizing the operating coil 73 of the lock-out relay 69. The ratchet member 71 is thereupon raised one notch. If a fault obtains in the unit that causes an excessive current to traverse the interrupter 6, a plurality of overload relays 77 are energized from a plurality of current transformers 78 and serve to completely disconnect that unit from the circuit 3 by close-circuiting the winding 30 of the control relay 31 by means of the overload-relay contact members 79. When the operating coil 30 of the control relay 31 is close-circuited and, consequently, de-energized, that relay is opened and all of the switching devices that control the unit, immediately open.

If the voltage of the direct-current circuit 4 is such as to immediately restart the unit, the consequent closing and re-opening of the interrupter 6, because of the fault, will raise the ratchet member of the relay 69 another notch. Upon the third occurrence of the closing and consequent re-opening of the interrupter 6, because of the obtaining fault, the switches 74 and 75 both become closed and are maintained in such position until an attendant may rectify the fault that obtains in the unit and reset the latching relay 69.

The switch 74, when closed, close-circuits the operating coil 30 of the control relay 31 and, thereupon, prevents the operation of that relay to energize the auxiliary control bus conductor 200. The closing of the switch 75 completes a circuit that serves to initiate the controlling equipment of the next unit to connect the converter of that unit to the direct-current circuit 4.

The switch 75 of the lockout relay 69 of the first unit is connected in parallel relation with the switch 21a of the second unit. Thus, when the lockout relay of the first unit is actuated to close the switch 75, the switch 21a is shunted to render the relay 27a responsive to the voltage condition of the direct-current circuit 4, which governs the condition of the switch 25a that is now connected in series with the switch 75 and the operating coil 26a of the relay 27a. The first unit in the predetermined sequence is now locked out of service and is replaced by the second unit.

I have thus far described the operations that occur in connecting a converter to the direct-current circuit and the method and means of disconnecting that unit from the system when a fault obtains therein. When one unit fails to be connected to the circuit because of a fault therein, it is essential that another unit be connected thereto if there is still a demand for energy on the circuit 4. Similarly, if the first unit is successfully connected to the circuit and the demand on that circuit exceeds the capacity of the one converter, a second unit should be connected to the system to supply energy for part of the load on the circuit 4.

To obtain this latter selective feature, I provide a thermal relay 81 that is energized from a current transformer 82. The relay 81 is heated in accordance with the current that traverses the circuit 3 and approximates the temperature characteristics of the converter 5. When the load and the temperature of the converter 5 attain or exceed a predetermined value, the thermal relay 81 becomes sufficiently energized to close a switch 83. The switch 83, when closed, completes a circuit for initiating the control apparatus of the second machine.

Provisions are also made for starting the second machine if the first machine is not connected to the direct-current circuit within a predetermined interval of time if the fault that prevents such connection is not such as would cause an excessive value of current to traverse the interrupter 6 to operate the overload relays, and, consequently, the notching relay 69. Such a fault might be a loose connection or an open circuit in the circuit of a control relay. To start the next machine, under such conditions, a definite-time, motor-operated relay 84 is employed, comprising a motor 85, two magnetic clutches 86 and 87, respectively, and two sets of contact members 88 and 89, engagement of which is effected after predetermined intervals of time.

When the control apparatus for connecting the converter 5 to the circuit 4 was initiated by the closing of the switch 25 by the voltage relay 24, a circuit was also completed from the control bus conductor 100 through the switch 21, switch 25, switch 60 of the contactor switch 16, the operating coil of a relay 90, and a switch 34a of the control relay 31a, of the second unit, to the control bus conductor 200 of the first unit. Since the second unit is not operating and since the control relay 31a of that unit is de-energized, the switch 34a of that unit is closed. Upon the energization of the control bus conductor 200, therefore, the relay 90 closes a switch 91.

A circuit is thereupon completed from the direct-current circuit 4 through the switch 91, the coil 86 of the magnetic clutch, the motor 85, a switch 92 of an underload relay 93, to the switch 53 of the running interrupter 11 which is closed when the interrupter 11 is closed.

The motor relay 84, therefore, does not begin to operate until the interrupter 11 closes. It is thus arranged since the converter may require considerable time because of the "pole slipping" operation to develop the correct polarity that is necessary. Upon the closing of the interrupter 11 and, consequently, of the switch 53, the motor begins to operate and the clutch 86 also becomes energized to start to close the switch 88. The switch 88 is adapted to close if the motor 85 and the clutch coil 86 are energized for a predetermined interval, for example, two minutes.

However, this condition will continue for two minutes only when some fault obtains in the unit, since a shorter interval will normally suffice to permit the connection of the machine to the system.

The circuit of the clutch coil 86 will be opened by the opening of the switch 60 of the contactor switch 16. The opening of that switch will de-energize the relay 90 and permit the switch 91 to open, thereby de-energizing the coil 86. Ordinarily, only a few seconds are required after the closing of the interrupter 11 to connect the converter 5 to the circuit 4. An interval of two minutes is therefore regarded as sufficient to take care of ordinary conditions encountered during operation.

If, however, the converter is not connected to the circuit before the interval of two minutes elapses, the switch 88 becomes closed. A circuit is thereupon completed from the control conductor 100 through the switch 88, the conductor 150 and the operating coil 26a of the relay 27a, of the apparatus for controlling the second machine, to the control conductor 101a.

Upon the energization of the relay 27a, the apparatus of the second unit is operated in a manner similar to that described above in connection with the first unit. Thus, if the first converter is not connected to the circuit 4 after a predetermined interval of time that is ordinarily sufficient for a normal unit, the apparatus for controlling the second machine is initiated.

At the same time that the clutch coil 86 of the relay 84 was energized, the clutch coil 87 was also energized since the switch 54 of the interrupter 11 and the switch 95 of the under-load relay 93 that are connected in series therewith were both closed. Consequently, when the interrupter 11 was closed, both the switches 88 and 89 of the timing relay 84 started to close. If the converter 5 is connected to the direct-current circuit 4 before the switch 88 is closed, the under-load relay 93 will be energized to open its switches 92 and 95, thereby de-energizing the motor 85 and both the clutch coils 86 and 87. The movable members of the switches 88 and 89 are thereupon permitted to return to their initial positions.

If the switch 88 closes before the converter 5 is connected to the direct-current circuit, however, and the apparatus for starting the second unit is initiated, the motor 85 and the clutch coil 87 remain in an energized condition after the switch 91 of the relay 90 is opened to de-energize the clutch coil 86. The circuit for maintaining energization of the motor 85 and the clutch coil 87 is maintained as long as the running interrupter 11 remains closed and connection between the converter 5 and the circuit 4 is not effected, so that the relay 93 is de-energized. Thus the movable member of the switch 89 continues to operate if the converter 5 is not connected to the circuit 4 before the switch 88 closes. If such connection is not effected within the interval of time that is required to close the switch 89, such as, for example, ten minutes, the switch 89 will be closed to close-circuit the operating coil 30 of the master relay 31, thereby de-energizing this relay to de-energize all of the controlling apparatus that is associated with the first unit.

The second unit in the sequence now continues to supply the load demand on the circuit 4 until the under-load relay that is associated with the second unit operates to disconnect this unit from the system. Upon a subsequent demand for energy on the circuit 4, the first unit in the sequence again attempts to start and to be connected to the circuit 4 to supply energy thereto. If the first unit again fails to be connected within the predetermined interval of time, the same cycle of events will occur as described above. If this same cycle occurs a third time, the contact members of the lockout relay 69 will have been actuated to close the switches 74 and 75 to lock the first unit out of service and to initiate the operation of the second unit as previously described.

In the event that the first unit in the sequence fails to be connected to the direct-current circuit within the two minute interval and the second unit is therefore started, but before the switch 89 of the timing relay 84 is closed such connection is effected, both units will be operating to supply energy to the circuit 4. If the demand for energy on the circuit 4 is less than the capacity of one machine, the second machine will be disconnected from the system and the first machine will be left connected to supply the demand alone. The means whereby the several units of the sequence are disconnected in the reverse order from that in which they are connected will be described later.

As described above, the operation of the thermal relay 81 or of the latching relay 69, both of the first unit, also completes circuits for energizing the relay 27a of the second unit to initiate the connection of the corresponding machine to the circuit 4.

The switch 83 of the thermal relay 81 is connected in parallel relation with the switch 88 of the timing relay 84 and the closure of either of these switches completes a circuit shunting both the sequence switch 21a and the switch 25a of the voltage relay 24a of the second unit in the sequence. Thus the closure of either of these switches causes the second unit to be started and connected to the system regardless of the voltage condition of the direct-current circuit 4, which controls the position of the switch 25a. The switch 75 of the lockout relay 69, however, is connected in series with the switch 25a so that when it is closed the operation of the second unit is governed by the condition of the circuit 4 in the same manner that the operation of the first unit was previously governed.

The reason for the difference in connection between these three switches, which are all adapted to cause the second unit to be started, is that the switch 75 of the lockout relay, when once closed, is latched closed until returned to its initial position by an operator. The switches 83 and 88, however, are permitted to return to their open position in response to predetermined conditions after they have been closed and it is therefore unnecessary that they be connected in series with the switch of the voltage relay 24a.

The under-load relay 93 mentioned above is connected to the terminals of a current shunt 94 that is connected in the circuit connecting the converter 5 and the direct-current circuit 4. When the current traversing the current shunt 94 exceeds a predetermined value, the relay 93 is sufficiently energized to open the switches 92 and 95 against the force of a spring 96.

When the demand on the circuit 4 decreases to or below a predetermined value, the switches 92 and 95 of the under-load relay 93 are, consequently, closed, and, since the running interrupter 11 is closed, a circuit is completed from the direct-current circuit 4 through the switch 54 of the interrupter 11, the switch 95 of the relay 93, the clutch winding 87 and the motor 85 of the relay 84, the switch 92 and the switch 53 to ground, thereby energizing the motor and the clutch winding 87.

The switch 89 is thereupon closed after a predetermined interval of time, for example, ten minutes. The switch 89, when closed, close-circuits the operating coil 30 of the control relay 31, thereby de-energizing that winding and opening the relay 30 to de-energize the auxiliary control bus conductor 200.

If, after the relay 84 has begun to operate to close the switch 89, a demand should be made on the circuit 4 before the switch 89 becomes closed, the re-energization of the relay 93, to or beyond a predetermined degree, will open the circuit of the motor 85 and the clutch 87 whereupon the movable member of the switch 89 is returned to its initial position. Since the switches 88 and 89 are returned to their initial positions when the clutches 86 and 87 are de-energized, the respective predetermined time elements for those switches are always preserved.

For a more complete description of the structure and the operation of the motor relay 84, reference may be had to the United States patent application, Serial No. 321,409, filed Sept. 3, 1919, by Roy J. Wensley, and assigned to the Westinghouse Electric & Manufacturing Company.

It will thus be observed that the disclosed system embodying my invention contemplates the selective operation of a plurality of synchronous converters by connecting one of those converters to the direct-current circuit when a demand is made thereon for energy and for selectively controlling the connection of the additional machines to that circuit in accordance with the load on the circuit and in accordance with the condition of the machine that is connected to that circuit. Thus, if the temperature or the load of the first machine exceeds a predetermined safe value, the connection of the second machine is effected.

Similarly, if a fault obtains in the first machine, or in the apparatus associated therewith, the second machine is selectively connected to the circuit and if the first machine fails to be connected to the system after three successive attempts, it is locked out until the fault may be rectified, that prevented the connection thereof to the circuit.

The selection of the first machine to be connected to the system may be controlled by means of the switches 21, 21a, etc. The closing of one of these switches determines the unit associated therewith as the first to be started when a demand is made on the circuit 4 for energy.

The circuits on the left-hand side of the broken line at the left-hand side of the diagram schematically illustrate the arrangement of the apparatus that controls the starting of the second machine in accordance with the conditions of the first machine, such as over-load, excessive rise in temperature, or failure to complete connection to the system. The corresponding parts of the control apparatus for the second machine are numbered similarly to those of the apparatus for controlling the first machine with the addition of the subcript "a".

As mentioned above, the selection of the first machine may be controlled by closing the switch 21, 21a or the corresponding switch in the other units if there are more than two. Although only two units are illustrated, it is readily obvious that the system is adapted for the control of any number of units. When the voltage of the circuit 4 drops to a predetermined value, the switch 25 of the voltage relay 24 is closed. The relay 27 is thereupon actuated to close its switch 28, whereupon the relay 31 is actuated to close its switches 32 and 33 and open the switch 34. The closing of the switch 33 energizes the auxiliary bus conductor 200.

Simultaneously with the energization of the relay 31, a circuit is completed from the control bus conductor 100 through the switch 21, the switch 25, the interlock switch 60 of the contactor switch 16, the operating coil of the relay 90, the interlock switch 34a of the relay 31a, and the switch 33 of the relay 31 to the control bus conductor 101. The interlock switch 34a is controlled by the relay 31a of the apparatus of the second unit. The relay 90 is thus maintained energized and the switch 91 maintained closed so long as the switch 25 of the relay 24 remains closed. When the converter is connected through the running interrupter 11, the interlocking switches 53 and 54 are closed, and, since the interlocking switches 92 and 95 of the under-load relay 93 are maintained closed until the converter is connected to the circuit, circuits are completed upon the closing of the interrupter 11 that energize the motor 85 and the clutch coils 86 and 87. If the converter is connected to the circuit before two minutes elapse after the closing of the interrupter 11, the switch 60 of the contactor 16 opens and the relay 90 becomes de-energized. The switch 91, consequently, opens and de-energizes the clutch 86. When the converter 5 is connected to the direct-current circuit 4 and begins to supply energy thereto, the under-load relay 93 is energized to open the switches 92 and 95. The motor 85 and the clutch coil 87 of the timing relay 84 are therefore also energized, and the switch 89 is returned to its initial position.

If, however, two minutes elapse before the converter is connected to the circuit, the switch 88 closes to complete a circuit for energizing the relay 27a that initiates the controlling apparatus of the second unit.

Upon the initiation of the starting and connecting apparatus of the second machine, the circuit of the relay 90 is opened by the opening of the interlock switch 34a of the relay 31a. The switch 91 of the relay 90 is consequently opened and the clutch 86 is de-energized. The switch 88 thereupon opens and returns to its initial position.

If the first unit is not connected to the system within the time that is required for the switch 89 to be closed, the operating coil 30 of the master relay 31 is close-circuited by the switch 89 to permit all of the controlling apparatus of the first unit to be de-energized. If such connection is effected before the switch 89 closes, however, both units supply the energy demand on the circuit 4. If this energy demand is less than the capacity of one machine, the second unit is disconnected after a predetermined interval of time, leaving the first unit to supply the demand.

If the apparatus of the first machine is set in operation but the machine is not connected to the direct-current circuit 4, the closing of the main circuit interrupter 6 will actuate the lock-out relay 69 by energizing the operating coil 73 each time it is closed. After the interrupter 6 has been closed three times, the switch 75 of the lock-out relay 69 becomes closed. A circuit is thereupon completed through the switches 75 and 25a, and the operating coil 26a of the relay 27a, that serves to energize the relay 27a to start the apparatus of the second machine.

The switch 83, that is operated by the thermal relay 81, is also closed when the load or the temperature of the first machine attains or exceeds a predetermined value. The connection of the second machine to the system is thereupon effected and the load on the circuit 4 is distributed between both machines. If the load increases and exceeds a predetermined percentage of the capacity of the two machines combined, the thermal relay 81a of the second unit initiates the starting equipment for starting the third machine (not shown).

It is, therefore, clear and obvious that any number of converters may be automatically operated in accordance with the conditions of the machines that may be operating, or in accordance with the conditions of the load circuit, if none of the machines are operating.

After all the machines in a station have been operating to supply a peak-load demand, and the demand decreases to a predetermined value, the underload relays 93, 93a, etc., close their respective switches to initiate the corresponding motor-time-element relays 84, 84a, etc.

The time elements of the several relays may be so graded that the relay controlling the last machine will have the minimum time element, as, for example, of five minutes. The relay controlling the preceding machine may be adjusted for seven minutes and the relay of the first machine for ten minutes.

Thus the last machine to be connected to the system will be the first to be disconnected. If the demand is then less than the capacity of one machine, the second will be similarly disconnected and the first machine left to supply the demand. The underload relay of the first unit may be adjusted for a very small value of current, or for any value of current. Of course, there will ordinarily be a sufficient demand on the station, for energy, to require the substantially continuous operation of at least one machine.

Although I have illustrated the system embodying my invention as applied to synchronous converters, it may be employed to control motor-generator sets, power transformers, or other independent sources of electrical energy.

I do not limit my invention to the devices that are illustrated nor to the arrangement of those devices, since modifications may be made therein within the spirit and scope of my invention, as set forth in the appended claims.

I claim as my invention:—

1. In an electric system, the combination with an electric circuit and a plurality of rotating electrical translating apparatus, of means for automatically starting the apparatus from rest and connecting the same to the circuit in a predetermined sequence in accordance with the power demand on the circuit.

2. In an electric system, the combination with an electric circuit and a plurality of electrical apparatus, of means for automatically connecting the apparatus to the circuit in a predetermined sequence in accordance with the power demand on the circuit, and means comprising a plurality of devices responsive to the amount of time required to connect certain of the apparatus to the circuit for controlling the sequence in which the apparatus shall be connected to the circuit.

3. In an electric system, the combination with an electric circuit and a plurality of electrical apparatus, of means for automatically connecting the apparatus to the circuit in a predetermined sequence in accordance with the power demand on the circuit and means energized upon the failure to connect any apparatus to the circuit within a predetermined interval of time for connecting the succeeding apparatus to the circuit in the predetermined order of sequence.

4. In an electric system, the combination with an electric circuit and a plurality of dynamo electric machines, of means for automatically connecting one machine to the circuit to supply a demand on the circuit, means for starting a second machine upon the failure of the first-mentioned means to connect the first machine to the circuit and means for precluding the first-mentioned means from attempting to restart the first machine.

5. In an electric system, the combination with an electric circuit and a plurality of electrical apparatus to be connected thereto, of means for automatically connecting the apparatus to the circuit in accordance with the power demand in a predetermined sequence controlled by the amount of time required to connect certain of the apparatus to the circuit and disconnecting the apparatus in a predetermined sequence in accordance with the decrease in the power demand on the circuit.

6. In an electric system, the combination with an electric circuit and a plurality of sources of electrical energy, of means for automatically connecting the sources of energy to the circuit in a predetermined sequence in accordance with the power demand on the circuit, means for connecting a second source to the circuit if the demand exceeds a predetermined value and automatic means for rendering the connecting means of the second source inoperative if the connection thereof to the load circuit has not been completed within a predetermined interval of time and for controlling the connection of a third source to the load circuit to supply the demand thereon.

7. In an electric system, the combination with a load circuit, and a plurality of electrical translating devices for supplying energy thereto, of means for automatically starting and connecting the several devices to the load circuit in accordance with the load demand thereon and means responsive to a thermal condition of the associated devices for initiating the automatic starting and connecting means of the other devices.

8. In an electric system, the combination with a load circuit and a plurality of dynamo electric machines for supplying energy thereto, of means for automatically starting and connecting the several machines to the load circuit in accordance with the load demand thereon and means connected between the starting and connecting means of successive machines in a predetermined sequence for controlling the operation of a succeeding machine in accordance with the operation of a preceding machine.

9. In an electric system, the combination with a load circuit and a plurality of dynamo electric machines for supplying energy thereto, of means for automatically starting and connecting the several machines to the load circuit in accordance with the load demand thereon and means connected between the starting and connecting means of successive machines in a predetermined sequence for controlling the operation of a succeeding machine in accordance with the temperature of a preceding machine.

10. In an electric system, the combination with a load circuit and a plurality of dynamo electric machines for supplying energy thereto, of means for automatically starting and connecting the several machines to the load circuit in accordance with the load demand thereon and means connected between the starting and connecting means of successive machines in a predetermined sequence and energized upon the failure of the connection of a preceding machine to the circuit, for initiating the starting and connecting means of the following machine and for subsequently rendering the starting and connecting means of the former machine ineffective.

11. The combination with a load circuit and a plurality of sources of energy, of means for automatically connecting the several sources to the load circuit, in accordance with the demand thereon, in a predetermined sequence, and means responsive to the amount of time required to connect certain of the sources to the circuit for controlling the sequence.

12. The combination with a load circuit and a plurality of sources of energy, of means for automatically connecting the several sources to the load circuit, in accordance with the demand thereon, in a predetermined sequence, and means for omitting one source of the sequence when that source fails to attain a predetermined condition within a predetermined interval of time.

13. The combination with a load circuit and a plurality of sources of energy, of means for automatically connecting the several sources to the load circuit, in accordance with the demand thereon, in a predetermined sequence, controlled by the amount of time required to connect certain of the sources to the circuit, and means for disconnecting the sources from the load circuit in accordance with the decrease in the demand upon the load circuit.

14. In an electrical power system, the combination with an alternating-current circuit, a direct-current circuit and a plurality of synchronous converters for translating energy therebetween, of means for connecting the converters between the two circuits in a predetermined sequence controlled by the time required to connect certain of the converters between the circuits in accordance with the power demand on one of the circuits.

15. In an electrical power system, the combination with an alternating-current circuit, a direct-current circuit and a plurality of synchronous converters for translating energy therebetween, of means for connecting the converters between the two circuits, and means for controlling the connecting means to effect the connection of the converters to the system in a predetermined sequence controlled by the time required to connect certain of the converters between the circuits.

16. In an electrical power system, the combination with an alternating-current circuit, a direct-current circuit and a plurality of synchronous converters for translating energy therebetween, of means for connecting the converters between the two circuits, means for causing the connecting means of the respective converters to connect the converters to the system in any predetermined one of a plurality of sequences and means responsive to the load upon one of the circuits for controlling the connecting means.

17. In an electrical power system, the combination with an alternating-current circuit, a direct-current circuit and a plurality of synchronous converters for translating energy therebetween, of means for connecting the converters between the two circuits and means responsive to an abnormal current condition in one converter, by reason of which it is desired to preclude the operation thereof, for controlling the operation of the connecting means of another converter.

18. In an electrical power system, the combination with an alternating-current circuit, a direct-current circuit and a plurality of synchronous converters for translating energy therebetween, of means for connecting the converters between the two circuits, means whereby the connecting means are caused to operate to connect the respective converters to the system in a predetermined sequence according to the energy demand upon the system and means responsive to an abnormal current condition in any converter or the associated connecting means, by reason of which it is desired to preclude the operation of such converter or connecting means, for controlling the connecting means of another converter.

19. The combination with an electric circuit and a plurality of apparatus to be connected thereto, of connecting means between the circuit and the respective apparatus, means responsive to a predetermined condition for automatically effecting the operation of the connecting means of a predetermined apparatus and means comprising a thermal relay for rendering the connecting means of another apparatus operative subject to predetermined conditions in the first-mentioned apparatus or its associated connecting means.

20. The combination with an electric circuit and a plurality of electrical apparatus to be connected thereto, of means automatically operative for connecting the apparatus to the circuit in a predetermined sequence, and means responsive to a thermal condition indicative of the load on one apparatus for controlling the connecting means of another apparatus.

21. The combination with an electric circuit and a plurality of electrical apparatus to be connected thereto, of means automatically operative for connecting the apparatus to the circuit in a predetermined sequence, and means comprising a thermal relay responsive to an abnormal condition in an apparatus or in the associated connecting means for controlling the operation of the connecting means of another apparatus.

22. The combination with an electric circuit and a plurality of electrical apparatus to be connected thereto, of means automatically operative for connecting the apparatus to the circuit in a predetermined sequence, and means comprising a thermal relay responsive to a condition indicative of an abnormal condition in the apparatus or in the associated connecting means for controlling the operation of the connecting means of another apparatus.

23. In an electrical system, the combination with a circuit to which a plurality of apparatus are to be connected, of means for connecting the respective apparatus to the circuit comprising a plurality of relay devices operative in sequence, each device depending upon the proper operation of the device preceding in the sequence, an initiating relay for controlling the energization of the relay devices and means responsive to the thermal condition of an apparatus for controlling the effectiveness of the initiating relay of another apparatus.

24. In an electrical system, the combination with a circuit to which a plurality of apparatus are to be connected, of means for connecting the respective apparatus to the circuit comprising a plurality of relay devices operative in sequence, each device depending upon the proper operation of the device preceding in the sequence, an initiating relay for controlling the energization of the relay devices, means responsive to a predetermined condition of the circuit for controlling the energization of the initiating relay of one apparatus and means comprising a thermal relay responsive to a condition of said last-mentioned apparatus for controlling the energization of the initiating relay of another apparatus.

25. The combination with an electric circuit and a plurality of electrical apparatus to be connected thereto, of controlling means for connecting each of the apparatus to the circuit, means responsive to an abnormal condition of an apparatus or the associated controlling means for actuating said controlling means to disconnect the apparatus from the circuit and means operable after the apparatus has been connected to and disconnected from the circuit a predetermined number of times by reason of abnormal conditions therein, for controlling the connecting means of another apparatus to effect the connection thereof to the circuit.

26. The combination with an electric circuit and a plurality of rotating apparatus to be connected thereto, of means for automatically starting the same from rest, establishing a predetermined energy-delivering condition therein relative to the circuit and connecting the same to the circuit, initiating devices therefor, means associated with each apparatus and arranged to be rendered effective upon the occurrence of a predetermined abnormal current condition in the apparatus or associated controlling means, and means for subjecting the initiating means of one apparatus to the abnormal current condition responsive means of another apparatus.

27. In a system of distribution, a distribution circuit, a plurality of sources of current, means associated with each source for connecting it to said circuit, a control device adapted to be operated to effect the operation of one of said connecting means, timing means controlled by said control device for effecting the operation of another one of said connecting means, and means controlled by a condition of the source whose connection to said circuit is normally controlled by said control device for rendering said timing means inoperative to effect the operation of another one of said connecting means.

28. In a system of electrical distribution, a supply circuit, a distribution circuit, a plurality of rotary transformers adapted to be connected between said circuits, means associated with each transformer for connecting it to said circuits, each of said last-mentioned means being arranged to be operated by the completion of a starting circuit associated therewith, means normally arranged to complete one of said starting circuits, and means controlled by a condition of the transformer associated with said last-mentioned starting circuit for interrupting said starting circuit and for completing another one of said starting circuits.

29. In a system of distribution, a distribution circuit, a plurality of sources of current, switching means for connecting each of said sources to said distribution circuit, means for controlling the operation of said switching means arranged so that the operation thereof normally controls said switching means to connect a certain one of said sources to said distribution circuit, and means connected to co-operate with said switch controlling means to establish the connection between another of said sources and said distribution circuit upon failure of said one of said sources to attain a predetermined voltage within a predetermined time interval.

30. In a system of distribution, a distribution circuit, a plurality of sources of current, switching means associated with each source for connecting the same to said circuit, means operative normally to effect the operation of one of said switching means to connect the source associated therewith to said circuit, means operative in response to current supplied to said circuit to effect the operation of a second switching means to connect the source associated therewith to said circuit, and means controlled by the voltage of the source associated with said one of said switching means for effecting the operation of said second switching means.

In testimony whereof, I have hereunto subscribed my name this 4th day of March, 1921.

CHARLES McL. MOSS.